United States Patent [19]

French et al.

[11] Patent Number: 4,714,888

[45] Date of Patent: Dec. 22, 1987

[54] APPARATUS FOR OBSERVING THE PASSAGE OF A PIG IN A PIPELINE

[76] Inventors: Hartley A. French, 67 Aldershot Crescent, Willowdale, Ontario, Canada, L2P 1L7; Anthony C. Richardson, 2679 Midland Ave., Agincourt, Ontario, Canada, M1S 1R8

[21] Appl. No.: 619,256

[22] Filed: Jun. 11, 1984

[51] Int. Cl.$^4$ ............... G01V 3/08; G01R 33/02; G08B 5/00

[52] U.S. Cl. ............... 324/326; 15/104.63; 33/363 K; 250/231 R; 324/67; 324/207; 324/260; 340/815.24; 340/815.29

[58] Field of Search ......... 324/67, 133, 220, 207, 324/244, 208, 259, 260, 178, 326, 345; 250/231 R, 231 SE; 340/659, 664, 815.07, 815.23, 815.24, 815.26, 815.29, 870.28, 870.29; 33/355 D, 363 K; 15/104.06 B; 361/180

[56] References Cited

U.S. PATENT DOCUMENTS

| | | |
|---|---|---|
| 1,873,579 | 8/1932 | Haas .................. 250/231 R X |
| 2,558,977 | 7/1951 | Pearson ................ 324/67 X |
| 2,709,800 | 5/1955 | Temple et al. ........ 340/664 X |
| 3,375,510 | 3/1968 | Pitches ................ 340/659 X |
| 3,436,656 | 4/1969 | Brand ................. 324/178 |
| 3,754,275 | 8/1973 | Carter et al. .......... 324/67 X |
| 3,902,168 | 8/1975 | Dola .................. 324/133 X |
| 4,414,543 | 11/1983 | Schweitzer ............ 324/133 X |
| 4,559,530 | 12/1985 | Ishigure et al. ........ 340/664 |

Primary Examiner—Gerard R. Strecker

[57] ABSTRACT

A device to give an indication of the passage of a pig through a pipeline and methods of performing various pipeline operations using the device are described. The device has a magnetic sensor based on a dip needle and the output of the sensor controls a flag actuating mechanism. Passage of a pig beneath a pig indicating device causes a flag to be raised giving a visual indication that the pig has passed that location. Methods are described in which one or more devices are used to find a lost pig, for accurately locating a defect in a pipeline, for determining if a pig has been correctly launched or received, and for determining and controlling the speed of a pig in a pipeline.

18 Claims, 15 Drawing Figures

APPARATUS FOR OBSERVING THE PASSAGE OF A PIG IN A PIPELINE

FIELD OF THE INVENTION

The present invention is concerned with a device to give an indication of the passage of a pig through a pipeline and with methods of performing various pipeline operations using the device.

BACKGROUND OF THE INVENTION

Pigs are moved through a pipeline either by fluid flowing within the pipeline or by a driving unit called a "crawler". The pigs are used as inspection or cleaning devices and are close-fitting within the pipeline.

Generally the pigs are launched at a launch station and after traversing a section of, say, 20 miles of the length of the pipeline, are recovered at a recovery station. Conventionally these stations have entry and exit gates by which they can be connected to and isolated from a pipeline during launch and recovery. Typically a launch is achieved by introducing the pig into a launch pipe section through the entry gate while the exit gate is closed. Thereafter the entry gate is closed, the exit gate is opened and the pig moved from the launch section into the pipeline either by fluid being introduced between it and the closed entry gate or under the power of the crawler. Thereafter the exit gate is closed.

To be assured that the launch has been achieved it is conventional to have a sharp-eared operative listen for the passage of the pig at some location downstream of the exit gate and to signal to a gate operator that the pig is launched. The present invention relates to a device useful in the operation of launching a pig and to a method of launching a pig.

The rate of progression of the pig through the pipeline is optimized by selecting, on a largely empirical basis, the setting of the crawler carrying the pig or, where the pig is moved by fluid flow, by adjusting the pressure of fluid flowing in the line. The device of the present invention is useful in measuring the rate of progression and contemplates a novel method of doing so.

A typical rate of progression of a pig through the pipeline may be about five miles per hour and so a pig can be expected to complete a twenty mile course in about four hours but there is a wide margin of error in this timing for firstly the rate cannot be set with any degree of accuracy and it is not constant throughout the course. To avoid damage to the gates of the recovery station it is necessary to slow the pig down and this is achieved by stationing a sharp-eared individual at a distance upstream of the recovery station to observe the passage of the pig and to have him signal to an operator controlling the rate of progression of the pig that it should be slowed. Thereafter the entry gate to the recovery station is opened while the exit gate is maintained closed and the pig passes into a recovery section of the pipeline. The entry gate is then closed and the pig thereafter removed from the station through the exit gate. The present invention relates to a device useful in the recovery of a pig from a pipeline and to a method of recovering a pig.

Occasionally a pig will become jammed in the pipeline and it then becomes necessary to locate the pig, plug the line upstream and downstream of the pig and cut the section of the pipeline within which the pig is jammed and remove it. This is a particularly time consuming and potentially dangerous operation when the pipeline is buried. To locate the pig, it is conventional to have an operative follow the course of the pig through the pipeline between the launch and recovery stations with a detector.

The present invention seeks to provide a device and a method of using the device which will facilitate the location of a jammed pig within a pipeline.

An inspection pig is one which has sensor means responsive to pipeline characteristics to produce signals which are recorded for later analysis. The pig conventionally has an odometer and a record of the distance travelled by the pig is made alongside the record of the sensor signals so that when analysis of the record of the sensor signals indicates a region of the pipeline with a potentially dangerous flaw, one can, by referring to the record of the odometer, discover that the flaw is a particular distance from the launch point. The problem with this is that the odometer is not accurate and also that it often occurs that there is no accurate map of the path of the pipeline so that to locate the potential flaw becomes difficult.

In U.S. Pat. No. 3,878,453 (Topping) there is shown a device for disposition in a specific geographical location adjacent a pipeline which generates a signal which is received by a pick-up coil carried by the pig which coil is effective to insert into the record made by the pig a characteristic signature which is used to particularly relate the location of the signature on the record to a specific geographical location along the course of the pipeline. This very substantially assists in the locating of flaws on the record since one is able to use the odometer output to measure a distance from reasonably closely spaced such devices. In this way the absolute error produced by the odometer is substantially reduced.

A problem which has arisen with these devices is that the power requirements are quite substantial particularly where it is necessary to put a signal through the pipeline overlay and through the pipeline into a pig. One technique has been to use a motor/generator set but this requires an operator and must be started up at an estimated time of arrival of the pig at the location and shut down after it has passed. Alternatively, batteries have been used but these are not long lasting.

The present invention seeks to provide a device and a method of using that device which are useful in facilitating operation of a device such as that described in the Topping U.S. patent.

According to one aspect of the present invention there is provided apparatus for observing the passage of a pig in a pipeline which comprises sensor means responsive to a change in ambient magnetic field resulting from the passage of a pig, control means operable by said sensor means and a visual signal means, said control means being effective to cause said signal means to become operative as the sensor means responds to the passage of a pig.

It has been found, surprisingly, that a simple dip needle can effectively sense the passage of a pig even in an underground pipeline and the use of such a device as the sensor means is highly desirable because it is rugged and very inexpensive relative to other devices which might be used.

Desirably the control means may be a light sensitive device responsive to changes caused by movement of the dip needle as a pig passes the apparatus, and producing a signal which can be used to control the visual signal means.

The visual signal means is conveniently a spring loaded flag held in a non-signalling position by a triggering device and in such an arrangement the control means may include a light sensitive device producing a signal which can be used to control a solenoid operating the triggering means to permit the flag to move to a signalling position.

According to another aspect of the present invention there is provided apparatus for indicating a change in a magnetic field comprising:

magnetic field sensing means responsive to a change in a magnetic field, the magnetic field sensing means being physically displaced in response to a change in the ambient magnetic field;

means for monitoring the physical displacement of the sensing means, said monitoring means providing a control signal when the sensing means moves a predetermined amount;

indicating means responsive to the control signal for providing a visible indication of the change in the ambient field, said indicating means being observable from a remote location.

According to yet another aspect of the present invention there is provided an indicating device for use with a sensor, said device comprising: a flag;

latch means for retaining the flag in a non-indicating position;

spring loading means coupled to the flag for urging the flag against the latch means;

said latch means being responsive to control signal from the sensor for release said latch means whereby said spring loading means urges the flag to a visible indicating condition.

According to yet a further aspect of the present invention there is provided a transducer for detecting changes in a magnetic field comprising:

a dip needle mounted for rotation in response to a change in magnetic field about an axis;

rotation indicating means coupled for simultaneous rotation with the dip needle for indicating the amount of rotation of the dip needle;

sensor means for detecting the amount of rotation, indicating means and for providing an output signal in response thereto.

It is to be appreciated that to use the device with a pig which would not normally produce a change in ambient magnetic field or which would produce a change not sufficient to be detected, it is possible to mount a magnet on the pig.

According to still another aspect of the present invention there is provided a method of observing the passage of a pig within a pipeline which comprises taking a device which comprises sensor means, preferably in the form of a dip needle, responsive to changes in ambient magnetic field, control means operable by said sensor means and a visual signal means controlled by said control means, disposing the device close to a pipeline in a position at which the sensor means will respond to changes in ambient magnetic field produced by the passage of a pig in the pipeline and observing the visual signal means.

The method may conveniently be used in launching a pig from a launch station and in such a procedure the device is located a little way downstream of the exit gate of the launch station and when a signal that the pig has passed is given by the device, the exit gate is closed.

There is also provided a method of observing the rate of progression of a pig through a pipeline which comprises disposing two of the devices a known distance apart along the route of the pipeline, recording the elapsed time between when the upstream one of the devices signals the passage of the pig and the downstream one of the devices gives such a signal and calculating the average speed of the pig in covering the known distance.

Additionally there is provided a method of finding a jammed pig which comprises disposing a plurality of the devices along that part of the route of the pipeline over which the pig is intended to travel, finding the most downstream one of the devices which signals that the pig has passed and searching for the pig over that portion of the pipeline between the most downstream one of the devices which signals that the pig has passed and the next downstream one of the devices.

Further according to this invention there is provided a method of inspecting a pipeline for potentially dangerous flaws with a pig which comprises fixing a signal sending device at a known location along a section of the pipeline to be inspected, entering the signal produced by that device on the inspection record produced by the pig, disposing a device for signalling the passage of a pig upstream of the signal sending device and completing a power supply to the signal sending device only when the signal indicating the passage of the pig is given. Preferably the completion of the power supply can be effected automatically in response to a signal generated by the device for signalling the passage of the pig. Preferably a fixed interval timer is associated with this power supply so that it is switched off automatically after the fixed interval.

According to another aspect of this invention there is provided a method of recovering a pig at a recovery station which comprises disposing a device for observing the passage of a pig upstream of the recovery station, reducing the speed of the pig upon the pig passing said device and opening the entry gate of the receiving station.

These and other aspects of the invention are illustrated in the accompanying drawings, in which:

FIGS. 4a, 4b, 4c and 4d show a magnetic sensor used in the circuit of FIG. 3 in various positions in response to different magnitudes of magnetic signals received from a pig;

FIGS. 5a, 5b, 5c and 5d illustrate electrical pulses from an electronic counter in the circuit of FIG. 3 corresponding to the positions of the magnetic sensor shown in FIGS. 4a, 4b, 4c and 4d respectively;

Figure 1:
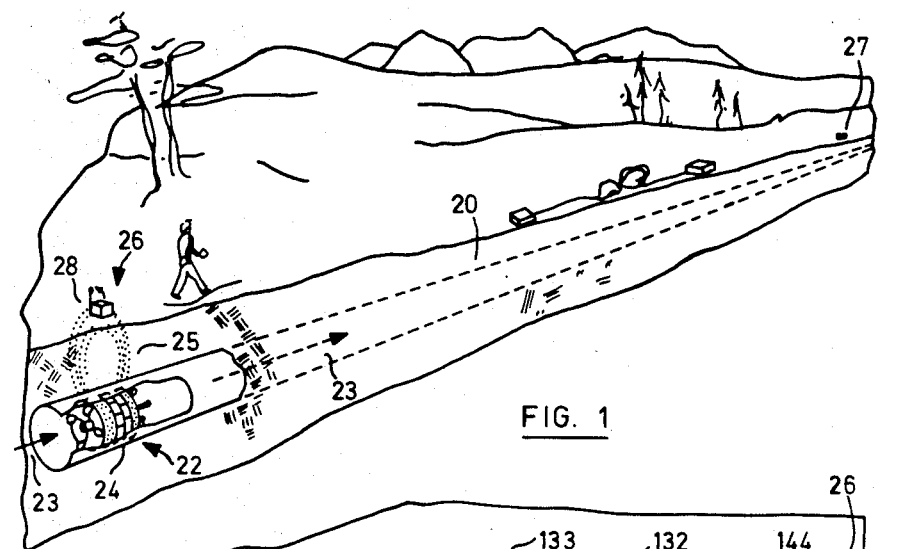
FIG. 1 is a perspective partly cut-away view of a landscape and showing an underground pipeline containing a pig and two devices for observing the passage of a pig spaced apart on the ground over the route of the pipeline.

Reference is made to FIG. 1 of the drawings, which shows the apparatus needed to locate a pig in an underground pipeline 20. The underground pipeline 20 contains an inspection pig 22 which is moved along the pipe in the direction of the arrow 23 by gas flowing within the pipeline. The pig 22 carries a plurality of magnets 24 which produce a magnetic field 25 of the shape shown by dotted lines and which has a significant value on the ground surface. A plurality of devices for observing the passage of the pig, two of which are shown and are generally indicated by reference numerals 26, 27, are spaced along the route of the pipeline. The devices 26, 27 have magnetic sensors, described in detail hereinafter, and include spring loaded indicator flags 28 which are visible at a distance.

As the pig 22 travels past a pig indicating device 26, the magnetic field 25 is detected by the magnetic sensor in the pig indicator device 26, as will be described in more detail later, and causes the spring loaded indicator flag 28 to be released. The flag 28 is urged to an upright and clearly visible position to indicate that the pig has passed beneath the device 26. In FIG. 1 it can be seen that the flag on the device 27 is not upright. This means that the pig is located somewhere between the two devices 26, 27.

Figure 2:
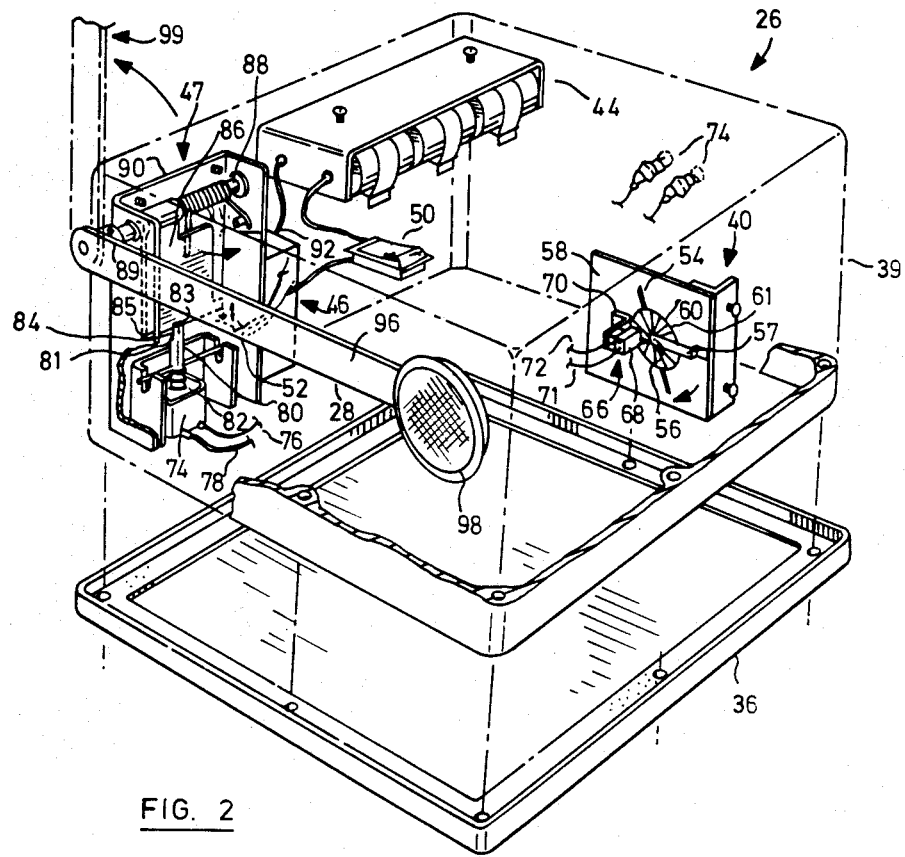
FIG. 2 is a perspective and partly broken away view of the device seen in FIG. 1 and to a larger scale.

Referring now to FIG. 2 of the drawings, the pig indicating device 26 comprises a non-magnetic casing 34 which is secured to a non-magnetic base 36 by bolts 38. The main components of pig indicating device 26 are a sensor, generally indicated by reference numeral 40 for sensing the change in magnetic field produced when a pig passes; a battery power supply, generally indicated by reference numeral 44, a control circuit 46 connected to the sensor 40 for processing the sensed signals and which controls actuation of the indicator flag 28, and an indicator flag arming and release mechanism, generally indicated by reference numeral 47 retaining the flag 28 in an armed condition and operable to release the flag in response to a signal from the sensor 40. The arming and release mechanism 47 is connected to the control circuit 46. The battery 44 is connected by an on-off switch 50 and by a series connected microswitch 52 to the sensor 40, to the control circuit 46 and to a pair of output terminals 74 to provide signals to external devices as will be described in more detail later.

Figure 3:
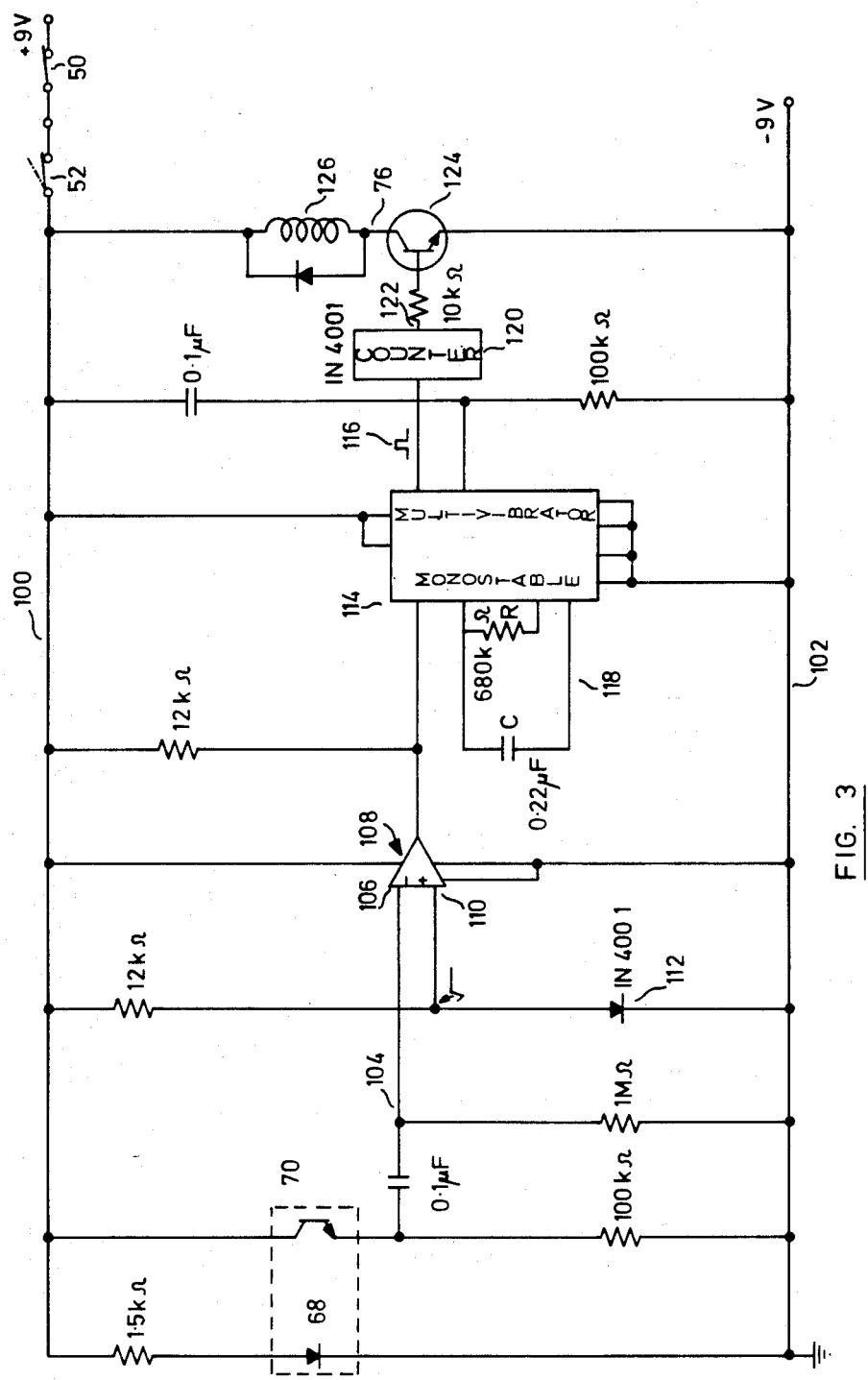
FIG. 3 is a circuit diagram of an electrical control circuit used in the device of FIG. 2 to provide a visual indication of passage of a pig.

The magnetic sensor comprises a dip needle 54 mounted on a spindle 56 carried by a bracket 57 for rotary movement and a circular card 60 also mounted on the same spindle 56 for movement with the dip needle. The bracket 57 is mounted to a plate 58 secured by screws to the casing 54. The card 60 is divided up into twenty four sectors 61 each having a 15° arc. Alternate sectors are light and dark and both types of sectors are opague to light. The dip needle 54 and the card 60 move together in response to a change in the ambient magnetic field, produced by the passage of the pig 22. An electrical transducer device generally indicated by reference numeral 66 includes, as best seen in FIG. 3, a light emitting diode 68 and a phototransistor 70. The light emitting diode 68 and the phototransistor 70 are connected to the electronic control circuit 46 by leads 71, 72 respectively. The control circuit 46 is connected to a solenoid 74 to the indicator flag arming and release mechanism 47 by leads 76, 78.

The solenoid 74 has a spring loaded piston 80 which is reciprocably movable in the direction of the arrows. When the solenoid is not energised, i.e. in the position shown, the spring 82 biases the piston 80 upwards. The piston has a rounded end 83 and a shoulder portion 84 cut away to define a recess 85 which receives the edge of a plate 86 when the device is armed, i.e. when the flag 28 is down as shown in FIG. 2. The plate 86 is mounted on a spindle 88 journalled in a bracket 90 and is spring loaded by a spring 92 which urges the plate 86 against the face of the recess 85. One end of the spindle 88 is secured by a screw 89 to the flag 28. The flag 28 consists of an arm 96 with a circular reflector 98 at its other end. Also abutting the plate 86 in the armed condition is the microswitch 52 which is connected between an on/off switch 50 and the battery power supply 44 to the control circuit 46. In the position drawn the plate 86 maintains the contacts of the microswitch closed.

The control circuit 46 referred to in FIG. 2 is shown in FIG. 3 in more detail. The light emitting diode 68 (LED) and the phototransistor 70 are connected between the positive and negative voltage rails 100 and 102 respectively. The on-off switch 50 is serially connected in the positive voltage rail 100 as is microswitch 52. On-off switch 50 enables the device to be stored with the flag down without using power. The phototransistor 70 is optically and electrically isolated from the light emiting diode 68 except when the circular card 60 is positioned such that a light reflecting sector 61 is opposite the LED to reflect incident light from the LED 68 back to phototransistor 70. The output 104 of the phototransistor 70 fed to the inverting (v−) input 106 of a comparator 108 connected by a differential amplifier. The comparator 108 provides an output signal when the voltage at the inverting input 106 exceeds the voltage at the non-inverting (v+) input 110. The output signal results from an increased amount of light falling on the phototransistor 70. The non-inverting input 110 is held to a fixed voltage v− by the diode 112. The output of the comparator 108 is fed to a monostable multivibrator 114 which is designed to produce an output pulse 116 in response to an input signal received from the comparator 108. The length of the output pulse 116 is set by selection of the resistance (R) and the capacitance (C) values of its timing circuit 118. The pulse 116 is fed to a counter 120 which counts the number of pulses from the monostable multivibrator 114. The sensitivity of the pig indicating device can be adjusted by programming the counter 120 so that it gives an output 122 only when a predetermined number of input pulses are counted. The output 122 is amplified by a power transistor 124 and is then fed by lead 76 to the winding 126 of the solenoid 75. The output is also fed to the terminals 74.

The operation of the pig sensing device 26 is best explained with reference to FIGS. 4a to 4d and FIGS. 5a to 5d which illustrate the response of the sensor 40 and control circuit 46 when the pig 22 passes beneath the device 26. Referring to FIG. 4a, the card 60 is initially adjusted so that light from the LED 68 impinges on a dark non-reflecting sector (a) of the card 60. There is insufficient light received by the phototransistor 70 to cause the comparator 108 to produce an output signal (see FIG. 5a). Therefore, no pulses are produced by the monostable multivibrator 114, and no signal is applied to the solenoid 75 so that unit 26 stays in the armed condition shown in FIG. 2. When the pig 22 passes beneath the device 26 the magnetic field 25 produced by the magnets 24 on the pig 22 changes the ambient magnetic field around the unit 26 and causes the dip needle 54 to move or "dip" to the position shown in FIG. 4b.

When this happens the card 60 rotates so that a reflecting or "light" sector (b) is opposite the LED and light from the LED 68 is reflected back to the phototransistor 70. This causes the phototransistor 70 to produce an output signal (see FIG. 5b) of a magnitude sufficient to cause the comparator 108 to produce an output signal. The monostable multivibrator 114, in turn, produces an output pulse 116 which is counted by the counter 120. With the counter threshold set to a single pulse, an output from the counter 120 is amplified by power transistor 124 and the output current energizes the solenoid winding 126. Energising the winding 126 causes the piston 80 to be retracted against the action of spring 82 so that the recess 85 and tip of the piston clear the edge of the plate 86. The coil spring 92 urges the plate 86 and the flag 28 to rotate on the spindle 64 to an upright position 99 (as shown in dotted outline in FIG. 2) indicating that the pig has passed this location.

Rotation of the plate 86 also causes the contacts in the microswitch 52 to open, and disconnects battery power to the control circuit 46, to the sensor 40 and causes a change in the output signal seen at terminals 74. When the flag 28 is upright in the indicating position, battery power is disconnected from control circuit, the sensor circuit and from the output terminals to prevent unnecessary power drain.

In order to arm or rearm the device, the arm 96 of the flag 28 is grasped and moved in a direction to bring the arm into the position as shown in FIG. 2. As the arm is pulled the plate 86 also rotates until its edge abuts the rounded shoulder 83 of the piston 80. The edge of the plate moves on the rounded shoulder and forces the piston 80 down against the spring 82 until the plate reaches the recess 85 defined by the shoulder 84. The spring 82 forces the piston 80 so that the edge of the plate 86 is located in the recess 85 of the piston 80. This is called the "armed" position. In the armed position the edge of the plate 86 again closes the contacts of the microswitch 52 so that power is connected to the sensor 40, to the control circuit 46, to the solenoid 75 and to the terminals 74.

As mentioned above, when the battery is disconnected this gives a change in the output signal to terminals 74. This change is detected by a circuit (not shown in the interest of clarity) and can be used to cause the power supply 30 to energise the coil 32 for a timed interval. A large magnetic field is produced by energizing the coil 32, and which is of such a magnitude that it induces a signal in a magnetic recorder carried by the pig. This signal is indexed against a distance signal from an odometer caused by the pig. The distance above the pipeline is, of course, accurately known from the position of the coil 32. The odometer's reading and the distance using the pig indicating devices indirected by the use of the coil can be correlated to correct for errors due to odometer inaccuracy. It should also be appreciated that the accuracy of the pig location and of structural defects can be increased by decreasing the spacing of the pig indicating devices and by increasing the number of coils 32.

Figure 6:
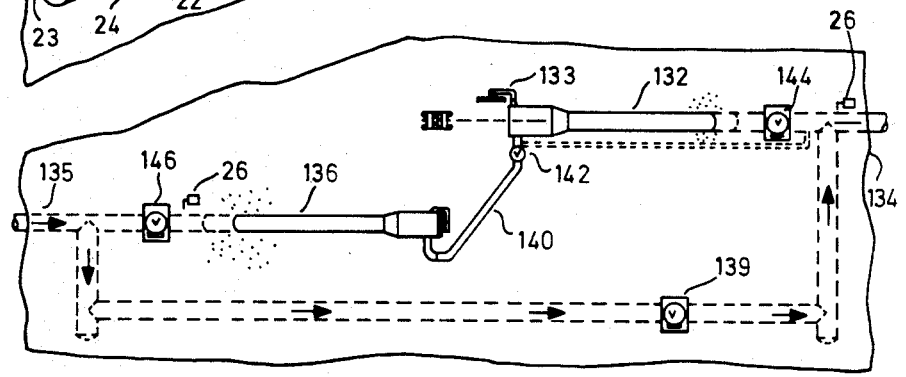
FIG. 6 shows a plan view of a part of a pipline showing a typical pig launching and a typical pig recovering station.
Figure 7:
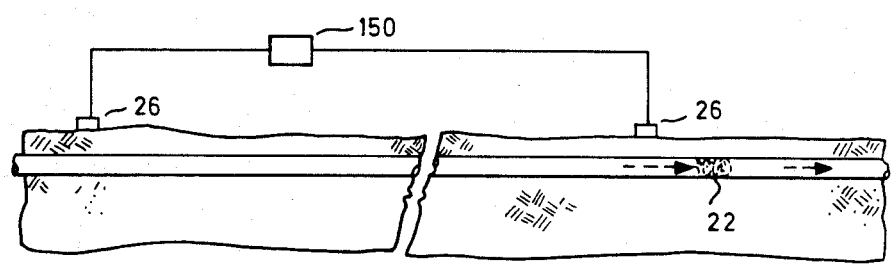
FIG. 7 shows a schematic view of apparatus used to determine the speed of a pig in a pipeline.

FIGS. 6 and 7 show other applications of the pig sensing device 26. In particular, FIG. 6 is a plan view of a pig launching station and pig recovery station generally indicated by reference numeral 130. The pig launching station comprises a launch section 132 with an entry gate 133, and an exit gate 144 leading into a section 134 of the pipeline. The recovery station 136 communicates with a section 138 of the pipeline. The sections 138, 134 are connected by a bypass pipe 137 with a valve 139. The launch section 132 and the receiving station 136 are connected by a pipe 140 with a valve 142 therein. This pipe arrangement is common in the art and is not part of the present invention. At the bottom of the launch section 132 there is an exit gate 144. A pig indicating device 26 is placed on the route of the pipeline above a location which is downstream of gate 144. To launch a pig, entry gate 133 is opened, the pig 22 inserted into the section 132 and the door 133 is then closed. The exit gate 144 is then opened. The valve 139 in the bypass pipe 137 is closed and gate 46 in the receiving pipe and valve 142 in the connecting pipe 140 are opened. This means that gas in pipe 138 is fed through the connecting pipe 140 to the launch station, to launch pig 22 into the pipeline 134. When this occurs, passage of the pig 22 into the main is indicated by the flag 28 of the device 26 moving to an upright position indicating a satisfactory launch. Conversely, if the flag stays down it indicates that the pig has not been launched.

A similar procedure is used to receive a pig with a device 26 being located on the route of pipeline at a point upstream of the gate 146. When the pig passes through the gate 146 the flag 28 moves upright, indicating that the pig 22 has been received in the receiving ramp 136. The gate 146 can then be closed and the pig 22 removed.

The speed of a pig 22 can be estimated and controlled using two or more spaced pig indicating devices 26 as shown in FIG. 7. When the pig passes the first unit 26, a clock 150 is started and on subsequent passage of the pig past the second unit 26, the clock 150 is stopped. From the time on the clock and the distance between the two devices, which is accurately known, the average speed of the pig between the devices can be calculated. The signal can be generated which is a function of the average velocity and this signal used to control the pressure of the gas in the pipe upstream of the pig, which in turn varies the velocity of the pig.

For pig recovery it is advantageous to place a device such as that in FIG. 2 upstream of the recovery station to observe the impending arrival of the pig so that it can be slowed to recovery speed and of course to open the recovery station entry gate.

Without departing from the scope of the invention it should be understood that several modifications may be made to the apparatus as hereinbefore described. For example, the threshold of the counter could be set to give an output after counting two or more pulses, especially in locations where the ambient magnetic field fluctuates or where there is stray magnetic fields due for example to motor vehicles which might otherwise trigger the unit. The sensitivity threshold in this way ensures that the solenoid is not inadvertently energised to release the flag and provide an erroneous indication that the pig has passed that location. This is shown in FIGS. 4c, 4d and FIGS. 5c and 5d. The dip needle 54 is moved so that the light spot is reflected from two reflecting sectors (b) and (d) and as shown the counter 120 counts two pulses 116, which is the counter threshold. The counter 120 produces an output signal 122 which energises the solenoid as described before.

Figure 9:
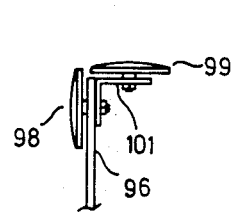
FIG. 9 shows part of an alternative indicator arm to that shown in FIG. 2.
Figure 8:
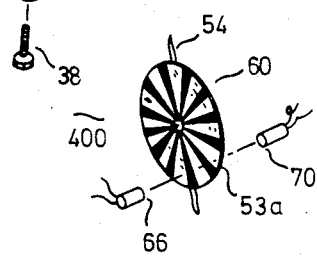
FIG. 8 shows part of an alternative magnetic sensor to that shown in FIG. 2.

The sensor 40 could be replaced by sensor 40a as shown in FIG. 8, in which like numerals denote like parts as in the preferred embodiment but with the suffix "a". The card 60a may have alternate transparent sectors to permit the transmission of light from the LED 60a to phototransistor 70a. This sensor 40a operates in the same way as sensor 40 of the preferred embodiment which is more compact and takes up less space. The reflector 98 may also be modified to include an additional reflector 99 mounted to the arm 96 by an angled bracket 101 as shown in FIG. 9. This arrangement allows the reflector to be easily seen by a helicopter, and facilitates a rapid aerial scan of the pipeline route.

Advantages of the preferred embodiments are that the pig sensing device is based on a straightforward, reliable, economic sensor utilizing a dip needle. The sensitivity of the sensor can be adjusted to suit the ambient magnetic surroundings; when the flag is released by the passage of a pig, the battery power supply is disconnected resulting in longer battery life. The pig sensing device can be used to control other apparatus to provide a signal recorded by the pig to give an accurate estimate of the location of a defect and of the length of the underground pipeline. It may also be used to provide an illuminated output and allow surveys to be carried out in the dark. The method provides a clear unambiguous indication of the location of a pig in a certain section of pipe, and other methods according to the invention can be used to assess if the pig was correctly launched or received, to determine and control the speed of the pig in the pipeline and to a cause magnetic signal indicative of the location of the pig sensing device to be recorded by recording means on the pig.

We claim:

1. Apparatus for observing the passage of a pig in a pipeline which comprises sensor means responsive to a change in ambient magnetic field resulting from the passage of a pig, control means operable by said sensor means, visual signal means movable between a ready position and an operative position and resettable holding means for holding said signal means in said ready position, said sensor means including a movable element which is physically displaced by said change in ambient magnetic field resulting from the passage of a pig, said control means including monitoring means for monitoring physical displacement of said movable element, said monitoring means producing a control signal upon the passage of a pig and means for applying said control signal to said holding means to cause said holding means to release said signal means to move from the ready position to the operative position.

2. Apparatus as claimed in claim 1 wherein said movable element comprises a dip needle.

3. Apparatus is claimed in claim 2 wherein the monitoring means is a light sensitive device responsive to movements of the dip needle as a pig passes the apparatus and producing a signal applicable to control the holding means.

4. Apparatus is claimed in claim 1 or claim 2 wherein the said visual signal means comprises a spring loaded flag held in the ready position by said holding means.

5. Apparatus as claimed in claim 1 wherein said movable element comprises a dip needle mounted for rotation about an axis and includes a planar circular surface mounted for simultaneous rotation with the dip needle, said planar surface being divided into a plurality of sectors adjacent ones of which are optically distinct, the monitoring means comprising an optical sensing system for sensing the rotation of the planar surface and giving a control signal when the planar surface and dip needle are rotated by a predetermined amount.

6. Apparatus as claimed in claim 5 wherein, alternate sectors are light-reflective and light-absorptive, both types of sectors being opaque to light.

7. Apparatus as claimed in claim 6 wherein the optical sensing system comprises a light-emitting device and a light sensitive detector, the light-emitting device and the light sensitive detector being positioned opposite the surface of the disc, the light emitted by the light-emitting device being reflected from the surface of the disc by the light reflecting sectors and being absorbed by the light absorbing sectors, the optical sensing system providing a control signal in response to receiving reflected light from a reflecting sector on the disc.

8. Apparatus as claimed in claim 5 wherein the planar, alternate sectors are light-transmissive and light-absorptive.

9. Apparatus as claimed in claim 8 wherein the optical sensing system comprises a light-emitting device and a light sensitive detector disposed on opposite sides of the disc and that said light sensitive device produces a control signal when a light transmissive sector of the disc is located between the two.

10. Apparatus as claimed in claim 7 or claim 9 wherein the light-emitting device is a light-emitting diode and the light sensitive detector is a phototransistor.

11. Apparatus is claimed in claim 1 wherein the signal means is a flag movable between a non-indicating position where it is substantially invisible from a remote location and an indicating position observable from the remote location.

12. Apparatus as claimed in claim 11 wherein the flag is spring loaded, and including latch means for holding the flag against a spring face when in said non-indicating position, said latch means being operated to release said flag in response to a control signal from the monitoring means.

13. Apparatus is claiming claim 11 wherein said flag is retained in the indicating position independent of further changes in the ambient magnetic field.

14. Apparatus is claiming claim 12 wherein the flag is a reflector secured at one end of a rigid arm, the arm being horizontal in the non-indicating position and vertical in the indicating position.

15. Apparatus as claimed in claim 12 wherein the latch means is controllable by a solenoid, the solenoid having a piston which engages a member securable to the arm, and the piston being movable in response to a control signal from the monitoring means.

16. Apparatus as claimed in claim 1, wherein the control means includes a control signal processing means connected between the monitoring means and said signal means, said control signal processing means including comparison means for comparing the control signal with a predetermined parameter and providing an output upon said predetermined parameter being exceeded, amplifying means for amplifying the output of said comparison means, the amplifying means providing an output signal for controlling the holding means.

17. Apparatus as claimed in claim 16 including output terminals connected to the amplifying means, the output terminals providing the output signal to any instrumentation connected thereto.

18. Apparatus as claimed in claim 16 wherein the sensor means comprises a dip needle and a planar disc rotatable therewith, said disc being divided into a plurality of sectors adjacent ones of which are optically distinct, said control signal processing means including an optical sensing system for observing rotation of said disc and for producing a pulsed control signal as the sectors of the disc pass said optical sensing system and counter means for counting the number of pulses in the control signal, said counter means providing an output upon a predetermined number of pulses being counted.

* * * * *